United States Patent Office

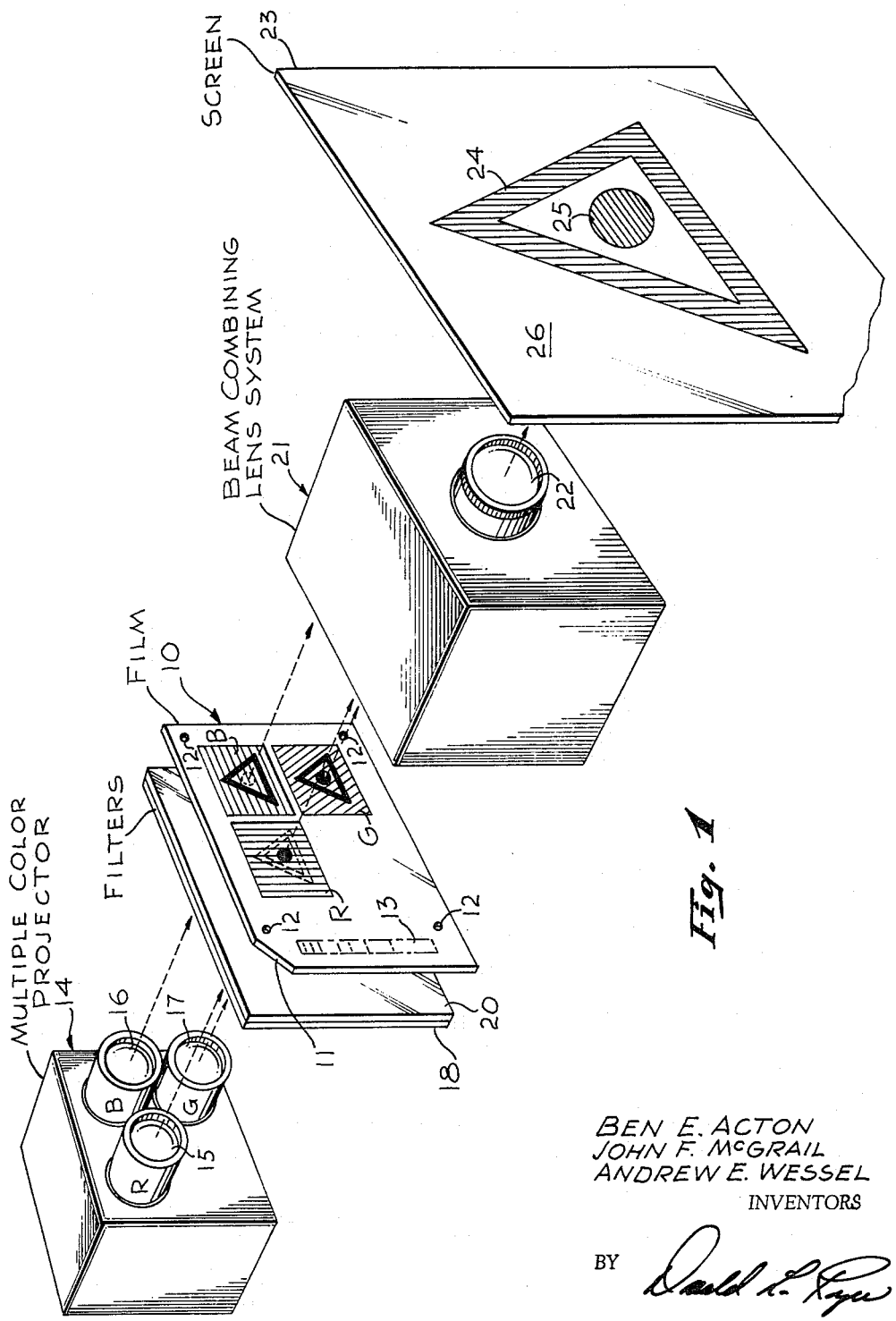

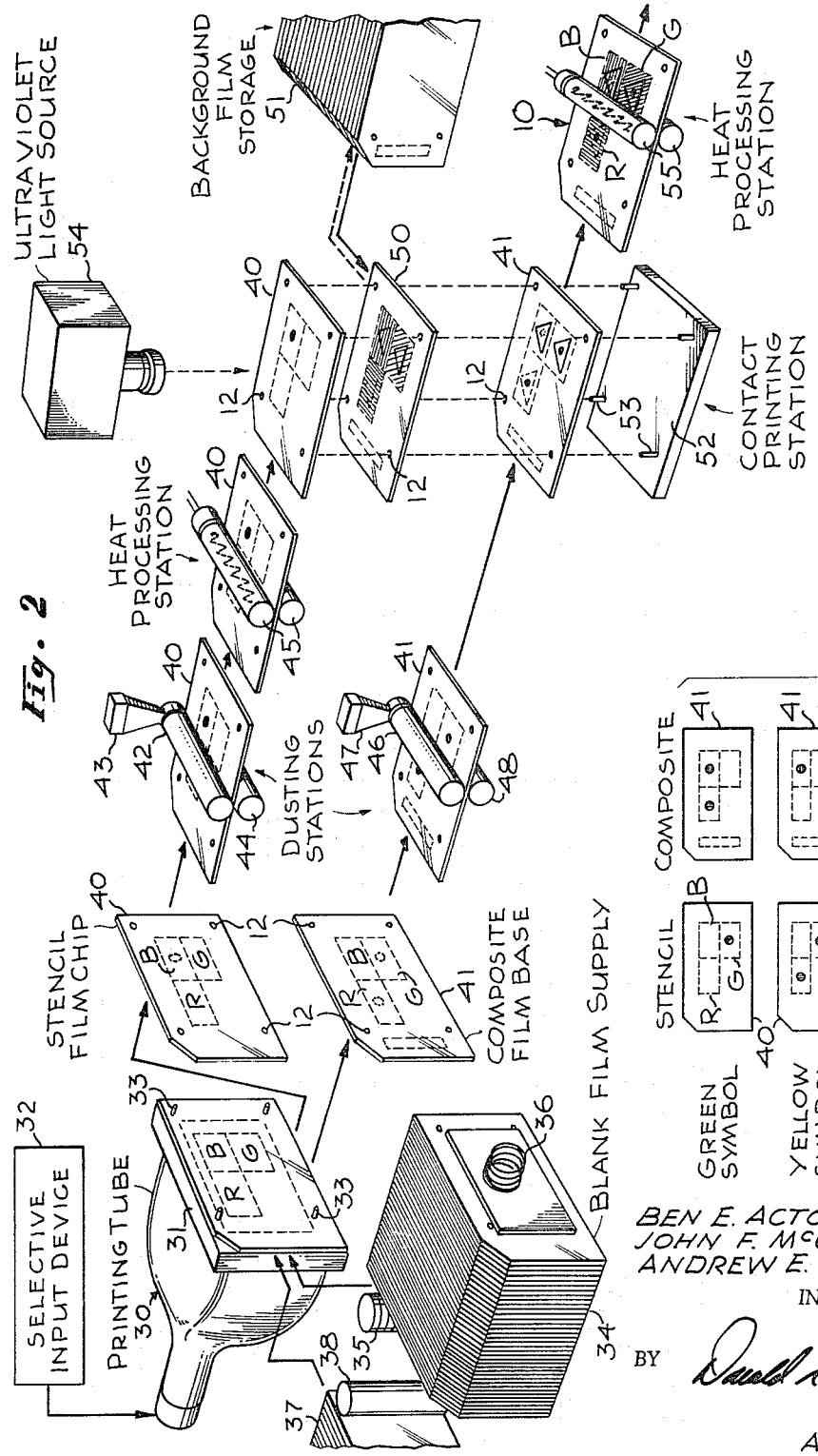

3,218,163
Patented Nov. 16, 1965

3,218,163
ELECTRO-OPTICAL IMAGE PRODUCING
METHOD AND APPARATUS
Ben E. Acton, Woodland Hills, John F. McGrail, Northridge, and Andrew E. Wessel, Woodland Hills, Calif., assignors, by mesne assignments, to The Bunker-Ramo Corporation, Stamford, Conn., a corporation of Delaware
Filed May 5, 1961, Ser. No. 108,014
14 Claims. (Cl. 96—1)

The present invention relates to the high-speed electro-optical sequential production of image bearing transparencies, such as display lantern slides and, more particularly, where the graphic indicia (such as characters, symbols, lines, diagrams and the like) defined by the image of each successively produced transparency represents data or information which is composite in character, a first portion of such data being subject to relative rapid antedating by more current data accumulated since the production of the previous transparency or slide with a second portion of such data being subject to less rapid antedating or remains substantially unchanged from one transparency to the next.

The invention further relates to the high-speed electro-optical production of such image bearing transparencies in response to electrical data signals, as for example derived from an output of digital computers or other data generating and/or data storing means, and in such a manner as to render the produced transparencies directly projectable by an optical system to produce on a display screen either high-definition monochrome images or high-definition polychrome images, the color components of which are free of undesired intermixing with or dilution by one another.

It is well known in the photographic art that two or more individual image-bearing transparencies may be combined in producing a composite transparency whose image defines graphic indicia which is a combination of the indicia defined by each of the individual transparencies. Such a technique is especially useful where a number of composite transparencies are to be produced whose images define indicia representing up-to-date information concerning one or more aspects of some changing event. For example, it may be desired to sequentially produce a series of lantern slides for use in projecting upon a display screen images depicting current statistical data, such as stock market trends in a specified industry. It is clear that the images of successive slides presenting such data in the same graphic format will be similar to one another, but not necessarily identical. Each slide image may therefore be considered as composite in character, one portion depicting relative static data, such as past stock market trends, with another portion depicting dynamic data, such as current stock market trends.

In accordance with prior art photographic techniques, such a composite slide transparency could be fabricated in a number of different ways. However, where high-speed and high-optical definition in the projection of the static data is demanded, advantage would be taken of the fact that the static data could be recorded as an image on a background film transparency. This background transparency could then be used in delineating the static portion of the image ultimately to be borne by each composite transparency. Another "interim" transparency would then be made for each composite transparency to be produced. This interim transparency would depict current dynamic data and may be thought of as a "current data" transparency. The background transparency and the current data transparency would then be combined in controlling the exposure to light of a piece of unexposed photographic film which forms the base of and will, after development, ultimately become the composite film transparency or lantern slide.

In carrying out such a process, it becomes clear that certain disadvantages are present. First, for each composite transparency produced, a "current data" film transparency has to be made and is ultimately wasted. Second, where high-speed operation is desired, the time required to prepare the copy format for, and both expose and fully process each current data transparency becomes significant. Third, where highest optical definition is required in the final composite transparency, high-speed chemical film developing processes and photo reversal processes should be avoided. The above considerations become even more noteworthy if it is desired that the individual composite transparencies be directly projectable upon a display screen to produce polychrome or multicolor images in which certain color aspects of the image play an important role in presenting both static and dynamic data. Distortion of such color aspects as by unwanted mixing of color depicting dynamic data, with background color depicting static data, may lead to confusion and error in interpreting the data it is intended be conveyed by the projected color image.

In accordance with the present invention, high-speed sequential production of image-bearing transparencies of the character above described is made possible by relying on the fact that many light-sensitive recording media, such as certain types of photographic film, possess or may be caused to have a surface exhibiting low-loss high-dielectric electrical properties, especially when such media are relatively dry. The present invention further takes advantage of the fact that, on such a surface, relatively small areas of electrostatic charge may be created in accordance with most any desired pattern such as, for example, a pattern corresponding to at least a part of the optical image detail it is desired ultimately to be borne by a given area of a medium. After creating such areas of charge, the medium may be dusted with a fine powder opaque to luminous energy such that the powder adheres substantially only to the charged areas of the medium. The adhering powder is, in accordance with the present invention, bonded to the medium so that it defines variations in opacity which co-mingle or blend with opacity variations photographically defined in or on the medium before or after the electrostatically charged areas are created.

Thus, in accordance with the present invention, a single composite image-bearing transparency may be produced with background or static portions of the image being defined by relatively slow acting photographic techniques while postdating or current data portions of the image are defined by relatively fast acting electrostatic printing techniques. Such electrostatic printing may, as will hereinafter be seen, be carried out under the control of electrical data signals.

In accordance with another aspect of the present invention, a further increase in the speed with which such composite transparencies may be produced is realized through the use of a film of the "dry-processable" type having the above described electrical characteristics. Films having a diazo compounded radiation sensitive emulsion are particularly suited to the practice of the present invention since such films, after controlled exposure to radiation to form a latent image, may be developed by subjecting the film to heat. Thus, in accordance with the present invention, the luminously opaque powder used in dusting the film, as above described, may be made of material which sinters and/or bonds to the film material at temperatures at or below the temperature at which the film is developed.

As will become more fully apparent hereinafter, the present invention is particularly suited to the making of composite image-bearing transparencies of the type described wherein at least part of the current-data portion of the image is represented by relatively small luminously opaque areas in the image borne by the composite lantern slide. In practicing the invention under these conditions, less overall electrostatic charge need be applied to the film base of the slide. This reduces the tendency of the film base to attract foreign dust particles while those that are attracted adhere only to areas intended to be ultimately opaque. The remaining areas are thus rendered free of dust so that photographic impressions corresponding to background data may be directly made to these remaining areas.

This latter feature of the present invention in turn makes possible the economical high-speed production of composite image-bearing transparencies from monochrome film yet capable of direct projection to form multicolor images on a display screen as mentioned hereinabove. Color mixing between background image areas and current data image areas is prevented through a color-masking technique as more fully described hereinafter.

Briefly, in accordance with the present invention, to permit the projection of a multicolor composite image of background and current data from a single transparency made from a monochrome diazo compound dry-processable film, the well known technique is employed of recording within the active illuminable area of a transparency at least three separate images each one representing a monochromatic record of a different one of three complmentary color versions of the composite color image to be projected. During projection of the slide by white light, the three images are optically combined or superimposed upon one another and through the use of color filters, the color of the light forming each superimposed image on the projection screen is made to correspond to the complementary color record it represents. In accordance with the present invention, however, current data indicia, for example, in the form of a dot or circle of selected color, is electrostatically defined and dusted, as generally described hereinbefore, before or after the base film of the composite slide is exposed to a background image bearing transparency—also in three image color separation form. In preventing color dilution and mixing, in accordance with the invention, electrostatic charges are placed on the base film of the composite transparency only in those areas of the film bearing complementary color records of a color which is not to form a component of the current data symbol to be projected. These color masks then prevent the photographically impressed background components in these areas from being projected on the screen. The colored indicia to be projected is, on the other hand, also electrostatically recorded and dusted to form an opacity on still another transparency which may be termed a stencil. This stencil transparency is then interposed between the light source used to photographically impress background data on the base film. The opacity on the stencil is so positioned that it interrupts light reaching those complementary color image areas of the base film corresponding to those colors which are to form components of the current data symbol to be projected.

Other and further important aspects and features of the invention will become apparent from the disclosures of the following detailed specification, appended claims and accompanying drawings, wherein:

FIGURE 1 is a generally diagrammatic perspective view representing an example of ultimate use of a transparency produced by the process of the present invention;

FIG. 2 is a diagrammatic perspective view showing various steps in one aspect of the process of the present invention; and FIG. 3 is a generally diagrammatic view illustrating means by which different colored symbols may be derived from a transparency produced in accordance with the process of the present invention.

The present invention will be specifically described in connection with an application thereof to a process for producing image bearing transparencies of the described color separation variety, the described process including a plurality of steps which acting together in various combinations produce novel structural elements useful apart from the specific process described and hence characteristically falling within the purview of the present invention as will hereinafter more fully appear. Additionally, it is to be understood that the invention is not to be construed as being limited to the specific number or sequence of the steps described. Furthermore, in accordance with the invention, the production of color separation transparencies is by way of example only, inasmuch as the invention is clearly applicable to the production of single monochrome image transparencies and to the production of individual non-composite transparencies on dry processable film material wherein only individual indicia are presented.

Within reference primarily to FIG. 1, an objective of one aspect of the process and apparatus of the present invention is the direct generation of a projectable transparency in a positive form and employing monochromatic film material having three, color separation imaging areas thereon. For purposes of illustration, the transparency is herein illustrated as being a sheet of film material that will hereinafter be designated as a composite film chip and indicated generally at 10. The film chip 10 is shown as being an individual sheet of material having one corner 11 cut on a bias as an orientation means. The illustrated film chip 10 is generally rectangular and further includes a plurality of percisely positioned locating holes 12. As further shown in FIG. 1, the film chip 10 has three separate, distinct and precisely positioned imaging areas which, for the purpose of illustration, are identified as areas R, B and G relating to corresponding color separation monochromatic images disposed in these areas and representing, for example, red, blue and green components of a final composite image. An area may also be provided on the film chip 10 for a suitable identifying symbol or number 13. While, for illustrative purposes, the film chip 10 is shown and described, it is to be understood that other forms of film material of different sizes and shapes as well as continuous roll film material may be employed without departing from the spirit and scope of the invention. As described hereinbefore, the film material is of the dry processable type, a particular film material suitable for the purpose being known as "Kalvar" film and manufactured by the Kalvar Corporation, 909 South Broad Street, New Orleans, Louisiana. This film material is insensitive to luminous energy although highly sensitive to electromagnetic radiation. The film is preferably constructed with a plastic base. While a plastic base is used in most instances, many different plastics may be employed for the purpose as well as other material such as glass or the like, with the base being in the order of three mils in thickness, the emulsion layer thereon being in the order of five mils in thickness.

The color separation images defined in the areas R, B and G of the film chip 10 have been lined to represent the particular color components corresponding thereto. Also, for purposes of illustration, an image comprising a red triangle having a blue circular dot therein has been shown. These symbols are further by way of example only as the image may be as desired to depict any particular information. For examples, one image may comprise the described graphs, charts, or the like with lines, symbols or other indicia being applied thereto to represent particular locations on the graph, chart or the like. The color separation negative is employed to project a full color image in a color additive manner. For this purpose, a multiple color projector 14 is employed which splits a white light into its red, blue and green components for respective projection through lens systems 15, 16 and 17. The lens systems 15, 16 and 17 serve to confine the individually colored light projected therefrom to the respective imaging areas R, B and G on the film chip 10. Inasmuch as the dry processable film material employed herein and forming the film chip 10, is highly sensitive to electromagnetic radiation and to heat, ultraviolet and infrared filters 18 and 20 are, in most instances, disposed between the multiple color projector 14 and the film chip 10. Obviously the film chip 10 may be supported by any suitable carrier means (not shown). The particular projection arrangement is by way of example, it being understood that a lens system employing filters for light beam splitting may also be used, with the film chip 10 disposed between the light source and the filters.

The three color projected images from the film chip 10 are received in a beam combining lens system indicated generally at 21 and having an output projection lens 22. The lens system 21 serves to combine the three colored images and to establish registry thereof for common projection from the lens 22. A lens system of this type is manufactured by and available from Colorvision Incorporated of Los Angeles, California. The composite image projected from the lens 22 may be directed upon a screen 23. As indicated, for the purpose of the present description, the image herein defined and projected on the screen 23 comprises a red triangle 24 having a blue dot 25 positioned therein. It will become apparent that the various symbols or other indicia in the projected image appearing on the screen 23 may be arranged as desired or overlie each other or may include a combination of the different primary colors either individually or to form backgrounds, symbols or other indicia in different hues. It is to be noted that the triangle, in the imaging area R of the film chip 10, is transparent, while the triangles in the imaging areas B and G are opaque, thus to permit passage of red light from the lens 15 and to block the blue and green light from the lens 16 and 17 respectively. Additionally, it is to be noted that the dot in the imaging area B is transparent while the dot in corresponding positions in the imaging areas R and G are opaque, and in a similar manner to that defined for the triangle, only the blue light from the lens 16 will pass through the film chip 10 in the area of the dot. The portions of the film in the background of the imaging areas R, B and G are transparent, thereby permitting passage of all three colors of light from the lenses 15, 16 and 17 which are combined in the lens system 21 to produce a projected white area 26 surrounding the triangle and dot images 24 and 25.

It may thus be seen that in order to provide a directly projectable positive film transparency, it is necessary to employ means by which the symbols in the imaging areas R, B and G on the film chip 10 are rendered either transparent or opaque to transmit or block desired colored components of white light. In the described prior processing techniques for dry processable film, utilizing a near ultraviolet light blocking material, such symbols would be transparent and a separate negative must thereafter be made in order ultimately to enable production of a transparency wherein the symbols are opaque. The present invention provides means by which such an immediately projectable transparency may be generated from dry processable film material without the necessity for producing an intermediate reverse image transparency, with the printing upon the film material being carried out by fully electronic means, in daylight and in an extremely rapid and efficient manner.

With reference to FIG. 2, the establishment of an electrostatic charge on, and electronic printing of the dry processable film material, is accomplished by means of a printing tube indicated generally at 30. The tube 30 is a cathode ray type electron tube having an output head 31 in which a plurality of conductors are arranged to form a linear target mosaic. A suitable tube for this purpose is known as a "Printapix" tube and is available from Litton Industries, Inc., of San Carlos, California. The tube may be fed by any suitable modulation input device 32 which serves to provide a video type signal derived from such devices as a flying spot scanner, a television camera or other types of pattern generators. The symbols produced upon the tube face may be simple dots or shapes, letters, numbers, or other representations desired for ultimate use as a portion of the composite image carried by the film chip 10. The printing tube 30 serves to establish an electrostatic charge in particular areas on the film material and in a shape to depict the desired symbol or other representation. The output head 31 of the printing tube 30 may be provided with suitable locating pins 33 that are adapted for disposition through the locating holes 12 in the film material. Additionally, a suitable platen (not shown) may be employed to insure contact and alignment of the film material relative to the output head 31 and the target mosaic contained thereon.

In accordance with the invention, the dry processable film material is retained in a suitable container 34 and urged toward a delivery means, in the form of a roller 35, by means of a compression spring 36. In some instances, as will be hereinafter more fully described, different types of film material may be employed and delivered to the printing tube 30 as by from a second container 37 and an advancement roller 38. The film material in the containers 34 and 37 may be the same, may be different in size and shape, or may carry different types of emulsions. Each sheet of the film material is provided with the locating holes 12. In another instance, one of the types of material may be plain and carry no emulsion. The rollers 35 and 38 may also serve to apply a number or other identifying information, as indicated at 13 on the film chip 10. For purposes of description of one aspect and embodiment of the invention, a single type of dry processable film material is delivered to the printing tube 30 from the container 34, with identifying information as at 13, being applied to alternate sheets of the film material.

The film material is thus delivered to the printing tube 30 and aligned with respect to the output head 31 by means of the locating pins 33. Alternate sheets of material are thus produced with electrostatic charges establishing latent images thereon, one of the alternate sheets of material being indicated as a stencil film chip 40 and the other sheet of material being indicated as a composite film base 41. The composite film base 41 may carry the identifying information as at 13. On the stencil film and composite film base 40 and 41 respectively, as indicated in FIG. 2, the imaging areas R, B and G have been delineated by a dotted line thereon merely to define the areas. In actual practice, the film material leaving the printing tube 30 is substantially transparent. In order to produce the particular dot type symbol used in the present example and to produce the symbol in the described color, a latent electrostatic image of the dot is established in the imaging area B on the stencil film chip 40 and at corresponding locations in the imaging areas R and G on the composite film base 41.

With reference to FIG. 3, it may be seen that the stencil film chip 40 and the composite film base 41 may have the electrostatic images established thereon in different positions, depending upon the desired color of the image in the ultimate projection thereof on the screen 23. The placement of the symbols in the imaging areas R, B and G of the film chip and film base is in accordance with requirements of the described color additive projection system.

Referring again to FIG. 2, following first the stencil film chip 40, after having the latent electrostatic image established thereon by the printing tube 30, the stencil film chip 40 is dusted with a near ultraviolet radiation blocking material, as by a roller 42, the material being fed from a hopper 43 or other suitable material distributing means. Another roller 44 serves as a back-up for the roller 42. The dusting material may be in the form of any suitable powdered substance that is at least opaque to the near ultraviolet radiation and that will be attracted and will adhere to the areas of the film where an electrostatic charge has been established. This powder may be, for example, minute iron particles, graphite, a combination of iron and graphite or iron particles intermixed with any suitable powder to form an opaque area within the confines of the latent image previously established electrostatic charge. In other instances, the blocking material may be minute plastic particles that are susceptible to attraction to the electrostatically charged areas of the film chip. A suitable plastic for this purpose is known as an "L-2 toner," also available from Litton Industries. The characteristics of the powder applied at the dusting station for the stencil film chip 40 are also such at least to enable adhesion to the electrostatically charged areas of the film chip until delivery to and use of the film chip in a contact printing station. The powder may also be of a nature to enable the fusing thereof and retention upon the film material when subjected to heat in the order of 240° F. for approximately two seconds. For this purpose, after dusting with the powder, the stencil film chip 40 may be directed between a pair of heated rollers 45 in a heat processing station where the powder is either melted on or otherwise caused to adhere permanently to the surface of the stencil film chip 40. From the heat processing station, the stencil film chip is then delivered to the contact printing station, details of which will be described in more detail hereinafter.

The composite film base 41, upon leaving the printing tube 30 and having an electrostatic charge established in particular areas thereon, is also delivered to a dusting station having, for example, a dusting roller 46, a hopper 47 and a back-up roller 48. At this dusting station, the electrostatic charge or charges on the composite film base 41 receive a dusting powder similar to that described in connection with the stencil film chip 40 and at least opaque to luminous light. Thereafter the composite film base 41 is also delivered directly to the contact printing station.

It may thus be seen that the stencil film chip 40 and the composite film base 41 have had the symbols or other indicia applied thereto in appropriate positions in the imaging areas R, B and G and that the symbols are in the form of opaque outlines or dots representing the desired symbols or other indicia. Accordingly, the stencil film chip 40 and the composite film base 41 are sandwiched in a manner to utilize the opaque symbol on stencil film chip 40 as a means for preventing later exposure of the composite film base 41 in the area thereof corresponding to this symbol. In another particular instance, and as illustrated in FIG. 2, background data may be added to the composite film base 41 by delivering a background film chip 50 from a storage container 51 and to a position in the contact printing station intermediate the stencil film chip 40 and the composite film base 41. The film chips 40, 50 and base 41 are all aligned by means of a platen 52 having locating pins 53 that are disposed through the locating holes 12 in the film chips and base. While being held in this sandwiched condition, the stencil film chip 40 and the background film chip 50 are utilized as negatives to print the composite information on the composite film base 41. For this purpose, electromagnetic radiation from a near ultraviolet light source 54 is used to expose the composite film base 41. The light source 54 may be a high energy mercury vapor lamp, exposure time being in the order of one tenth to one second depending upon the radiation intensity. Thereafter, in one aspect of the invention, the background film chip 50 is returned to the storage container 51 and the stencil film chip 40 is discarded.

Following exposure of the composite film base 41 to the near ultraviolet radiation in the 3800 to 3900 angstrom band, as described hereinbefore, the exposed composite film base 41 is delivered to a heat processing station wherein a pair of heated rollers 55 serve to produce heat in the order of approximately 240° F. and sufficient to develop the latent image produced by exposure to the near ultraviolet radiation. The heating further serves, simultaneous with the described development, to set, melt or otherwise affix the dusting power, applied to the composite film base 41 in the dusting station, to the composite film base. A resulting positive transparency is thus produced, is now identified as the previously described completed film chip 10 and is directly projectable. It may be seen that the projected triangle symbol 24 forms a background and is derived from the background film chip 50, temporarily removed from the background film storage container 51, and that the dot symbol 25 is opaque in the R and G imaging areas of the completed film chip and transparent in the imaging area B.

The completed film chip 10 is thus permanent and substantially completely fixed except in areas thereof that are unexposed to the near ultraviolet radiation. Clearing or fixing of these areas may be accomplished by re-exposure of the film chip to further near ultraviolet radiation to release the remaining nitrogen gas in the emulsion. This exposure may also be accomplished during projection of the film chip, as sufficient ultraviolet radiation in the desired range is available from most projection lamps, the only necessity being the maintenance of the film below the development temperature of 240° F. In this latter instance, the ultraviolet filter 18 is omitted from the projection system illustrated in FIG. 1. The film chip thereafter becomes completely fixed after three to four hours during which time the nitrogen gas released by the re-exposure escapes from the film emulsion.

Having described the more complex aspect of the present invention and utilization of the process to produce composite color separation transparencies, reference is again made to portions of FIG. 2. A composite monochromatic transparency having a single image composed of background data together with updating symbols or other indicia thereon, may be produced in a manner similar to that previously described without a need for the stencil film chip 40. In this instance, the composite film base 41 is processed in the manner described following establishment of an electrostatic charge thereon and in areas thereof wherein updating data, in the form of symbols or other indicia, is desired. Thereafter, background data from the background film chip 50 is printed onto the composite film base 41 and the composite film base 41 is thereafter heat processed. Thus, high speed electro-optical means are provided for adding updating data to existing background data and for producing an immediately projectable image bearing transparency. In actual practice, both the described composite color separation image bearing transparency and the more simplified composite single image bearing transparency may be produced by the present process in an elapsed time of from three to eight seconds from the electronic printing thereof to a projected image using the newly created composite transparency.

In another from and aspect of the invention, it will be understood that the background film chip 50, if also of a material enabling the establishment of electrostatic charges thereon, may be used directly and without the necessity for the stencil film chip 40. In this instance, it is also necessary that any new symbols, applied to the background film chip 50, are also intended to remain as a permanent portion of the background film chip. In such an instance, the background film chip 50 follows the same steps as those described for the stencil film chip 40 and, following exposure to the near ultraviolet radiation and contact printing upon a new composite film base, is thereafter returned to the background film storage container 51. This aspect of the invention is particularly useful when adding continuing data to a background film chip as, for example, continuing extensions of a curve on a graph.

In still another variation and aspect of the present invention, inasmuch as the stencil film chip 40 is discarded after use thereof in the contact printing station, the material of the stencil film chip 40 need not have an emulsion thereon and may be plain material such as "Mylar," delivered to the printing tube alternately with sheets of the dry processable film material. For this purpose, the plain film material is delivered from the film container 37 while the dry processable film material is delivered from the container 34.

In accordance with the present invention, it is to be understood that the heat processing stations may also employ other types of heat producing devices, such as a direct flame, an oven or exposure of the film material to infrared radiation from a suitable infrared light source. As indicated, it has been found that a temperature in the order of 240° F. for approximately two seconds is satisfactory for both the setting of the dusting powder and for development of the dry processable film material following exposure to ultraviolet radiation. With higher temperatures, a shorter duration of heat processing may be used.

While dry processable film material is described for use herein, silver halide film material may also be employed as the material of the background film chip or in other instances where applicable.

Having thus described the invention and the present several embodiments thereof, it is desired to emphasize the fact that many further modifications may be resorted to in a manner limited only by a just interpretation of the following claims.

We claim:

1. The method of forming a composite optical image bearing transparency on a transparent base material having deposited thereon a light sensitive emulsion, said base material also having a working surface exhibiting a relatively high dielectric constant, the steps comprising: delineating on the working surface of said base at least one electrostatically charged area; applying a material to said working surface, said material being opaque only to a selected radiation spectrum and attractable by electrostatic charges; exposing said emulsion to radiation for producing a latent image therein through an image bearing transparency representing a first portion of the composite image it is desired to be formed; developing said emulsion to bring out said latent image; and fixing said material to said base to form a second portion of said composite image; said first and second portions of said image being noncomplementary to one another.

2. The method of forming variable opacity composite optical images on a transparent base material having deposited thereon a photographic emulsion, said base material also having a working surface exhibiting a relatively high dielectric constant: delineating on the working surface of said base at least one electrostatically charged area coincident with a first portion of said composite image; applying a material to said working surface, said material being opaque to selected radiation and attractable by electrostatic charges; exposing said emulsion to radiation capable of producing a latent image in said photographic emulsion through an image bearing transparency defining a second portion of said composite image; developing said photographic emulsion to bring out said latent image; and fixing said material attracted to said electrostatically charged area to said base to form another portion of said image; said first and second portions of said composite image being noncomplementary to one another.

3. The method of forming composite optical images on a transparent base material having deposited thereon a light sensitive emulsion, said base material also having a working surface exhibiting a relatively high dielectric constant the steps comprising: delineating on the working surface of said base at least one electrostatically charged area coincident with a first portion of said composite image; applying a material to said working surface, said material being opaque to luminous light and attractable by electrostatic charges; exposing said emulsion to radiation capable of producing a latent image therein through an image bearing transparency representing a second portion of said composite image it is desired to be formed on said base; developing said emulsion to bring out said portion of said second composite image; and simultaneous with said developing, fixing said material to said base to form said first portion of said image; said first and second portions of said composite image being noncomplementary to one another.

4. The method of producing a composite image bearing transparency from data including electrical data signals wherein said composite image is comprised of first and second noncomplementary portions, said method comprising: estblishing an electrostatic latent image comprising said first portion of said composite image, on a surface of emulsion carrying film material in response to said data signals; applying a material which is opaque to selected radiation to said latent image on said surface; combining said film material with an image bearing transparency having graphic indicia delineated thereon comprising said second portion of said composite image; exposing said emulsion on said film material through said image bearing transparency to radiation to which said emulsion is sensitive; and developing said emulsion to produce said graphic indicia in said emulsion and simultaneously to fix said material on said surface to provide a composite image on said film material derived from the electrical data signals and the image bearing transparency.

5. The method of producing a composite comprised of first and second noncomplementary images on dry processable film comprising: applying electrostatically charged latent images to films to produce a stencil film corresponding to said first image and a composite film base corresponding to said second image, at least said composite film base being dry processable; applying first and second materials to said latent image on said stencil film and composite film base respectively; exposing said composite film to radiation to which said first material is opaque through said stencil film thereby printing said first image carried by said stencil film onto said composite film base; and processing said exposed composite film base to provide said composite image thereon.

6. The method of producing a composite comprised of first and second noncomplementary images on dry processable film comprising: appling electrostatically charged latent images to transparent films to produce a stencil film corresponding to said first image and a composite film base corresponding to said second image, at least said composite film base being dry processable; applying first and second materials which are opaque to selected radiation spectrums to said latent images on said stencil film and composite film base respectively, said materials being attracted by said electrostatically charged latent images; exposing said composite film base to said selected radiation to which said first material is opaque through said stencil film thereby printing said first image carried by said stencil film onto said composite film base; and processing said exposed composite film base to thereby set said second material thereon thus defining said second image and to develop exposed areas thereof thus defining said first image.

7. The method of producing a composite comprised of first and second noncomplementary images on dry processable film comprising: applying electrostatically charged latent images to transparent films to produce a stencil film corresponding to said first image and a composite film base corresponding to said second image, at least said composite film base being dry processable; applying a material which is opaque to a selected radiation spectrum to said latent images on said stencil film and composite film base; exposing said composite film base to said selected radiation spectrum through said stencil film thereby printing said first image carried by said stencil film onto said composite film base; and processing said exposed composite film base to thereby set said material thereon thus defining said second image and simultaneously to develop exposed areas thereof thus defining said first image.

8. The method of producing a composite comprised of first and second noncomplementary images on dry processable film material comprising the steps of: applying electrostatically charged latent images to film materials to produce a stencil film corresponding to said first image and a composite film base corresponding to said second image; applying a powder to said latent images on said stencil film and composite film base to establish images which are opaque to ultraviolet radiation; setting said powder on said stencil film thus defining said first image; exposing said composite film base to ultraviolet radiation through said stencil film thereby printing a latent image corresponding to said first image areas carried by said stencil film onto said composite film base; and heat processing said exposed composite film base to thereby set said powder thereon thus defining said second image and simultaneously to develop exposed areas thereof thus defining said first image.

9. The method of producing an image on dry processable film material comprising: applying electrostatically charged noncomplementary latent images to film materials to produce a stencil film and a composite film base, said composite film base having a preestablished background image thereon; applying first and second materials to said stencil film and composite film base respectively, said materials being attracted to areas thereof having an electrostatic charge at least said first material being opaque to ultraviolet radiation; exposing said composite film base to substantially ultraviolet radiation through said stencil film thereby printing the background and electrostatically produced images carried by said stencil film onto said composite film base; and heat processing said exposed composite film base to thereby set said second material thereon and simultaneously to develop exposed areas thereof to provide a composite image thereon.

10. The method of producing color separation images on monochromatic dry processable film comprising: applying electrostatically charged noncomplementary latent images to specific areas of two transparent films to produce a stencil film and a composite film base respectively, at least said composite film base being dry processable and at least a portion of said areas of said stencil film and composite film base being complementary; applying a material which is opaque to selected radiation to at least said stencil film, said material being attracted only to areas thereof having an electrostatic charge; exposing said composite film base to said selected radiation through said stencil film thereby printing the image carried by said stencil film onto said composite film base; and heat processing said exposed composite film base to thereby set said material thereon and simultaneously to develop exposed areas thereof to provide a composite image thereon.

11. The method of producing color separation composite images on monochromatic dry processable film comprising: applying electrostatically charged noncomplementary latent images to specific areas of two transparent films to produce a stencil film and a composite film base, at least said composite film base being dry processable and at least a portion of said areas of said stencil film and composite film base being complementary; applying first and second materials to said stencil film and composite film base respectively, said materials being attracted only to areas thereof having an electrostatic charge, said first material being opaque to ultraviolet radiation and said second material being opaque to radiation in the visible spectrum; setting said first material on said stencil film; exposing said composite film base to substantially ultraviolet radiation through said stencil film and a separate background film carrying portions of said composite images thereby impressing the images carried by said stencil and background films onto said composite film base; and heat processing said exposed composite film base to set said second material thereon and simultaneously to develop exposed areas thereof to provide said composite images thereon.

12. The method for generating color separation images on monochromatic dry processable film comprising the steps of: applying electrostatically charged noncomplementary latent images to specific areas of sheets of transparent films to produce a stencil film and a composite film base, at least said composite film base being dry processable and at least a portion of said areas of said stencil film and composite film base being complementary; applying first and second metallic powders to said stencil film and composite film base respectively, said powders being attracted only to areas thereof having an electrostatic charge, said first metallic powder being opaque to radiation in the 3800 to 3900 angstrom band and said second metallic powder being opaque to radiation in the visible spectrum; heating said stencil film thereby setting said first metallic powder thereon; exposing said composite film base to radiation substantially in the 3800 to 3900 angstrom band through said stencil film and through a separate background film having at least a portion of the images to be generated thereby printing the images carried by said stencil and background films onto said composite film base; and heat processing said exposed composite film base at a temperature of approximately 240° F. thereby setting said second metallic powder thereon and simultaneously to develop the areas thereof exposed to radiation substantially in the 3800 to 3900 angstrom band to provide a composite image thereon.

13. The method of forming variable opacity composite optical images comprised of first and second noncomplementary portions on a transparent base material having deposited thereon a light sensitive emulsion, said base material also having a working surface exhibiting a relatively high dielectric constant: delineating on the working surface of said base at least one electrostatically charged area corresponding to said first portion; applying a powdered material to said working surface, said powdered material being opaque to selected radiation and attractable by electrostatic charges; exposing said working surface to radiation capable of producing a latent image in said emulsion representing said second portion of said composite image; developing said emulsion to bring out said second image portion; and fixing said powdered material to said base to form said first image portion.

14. The method for forming variable opacity composite optical images comprised of first and second noncomplementary portions on a transparent base material having deposited thereon a photographic emulsion, said base material also having a working surface exhibiting a relatively high dielectric constant: delineating on the working surface of said base at least one electrostatically charged area corresponding to said first portion; applying a finely powdered material to said working surface, said powdered material being opaque to selected radiation and attractable by electrostatic charges; exposing said working surface to radiation capable of producing a latent image in said photographic emulsion through an image bearing transparency representing said second portion of said composite image; developing said photographic emulsion to bring out said second image portion; and fixing said powdered material to said base to form said first image portion.

(References on following page)

References Cited by the Examiner

UNITED STATES PATENTS

| | | | |
|---|---|---|---|
| 2,143,214 | 1/1939 | Selenyi | 96—1 |
| 2,915,581 | 12/1959 | Pajes | 96—43 |
| 2,939,787 | 6/1960 | Giaimo | 96—1 |
| 2,962,375 | 11/1960 | Schaffert | 96—1 |
| 2,993,805 | 7/1961 | Kay | 96—49 |
| 3,032,414 | 5/1962 | James et al. | 96—49 |
| 3,033,765 | 5/1962 | King et al. | 96—29 |
| 3,037,863 | 6/1962 | Prater | 96—43 |
| 3,113,022 | 12/1963 | Cassiers et al. | 96—91 |

OTHER REFERENCES

"Focal Encyclopedia of Photography," Focal Press, New York, 1956, page 243.

NORMAN G. TORCHIN, *Primary Examiner.*

PHILIP E. MANGAN, *Examiner.*

UNITED STATES PATENT OFFICE
CERTIFICATE OF CORRECTION

Patent No. 3,218,163            November 16, 1965

Ben E. Acton et al.

It is hereby certified that error appears in the above numbered patent requiring correction and that the said Letters Patent should read as corrected below.

Column 3, line 31, for "complmentary" read -- complementary --; column 4, line 20, for "Within" read -- With --; line 32, for "percisely" read -- precisely --; column 8, line 58, for "from" read -- form --; column 10, line 8, for "portion of said second" read -- second portion of said --; line 17, for "estblishing" read -- establishing --; line 50, for "appling" read -- applying --.

Signed and sealed this 14th day of January 1969.

(SEAL)
Attest:

Edward M. Fletcher, Jr.            EDWARD J. BRENNER
Attesting Officer            Commissioner of Patents